Patented Sept. 29, 1942

2,297,063

UNITED STATES PATENT OFFICE 2,297,063

STABILIZED MINERAL MATTER AND
METHOD OF PREPARING THE SAME

Claude L. McKesson and Vilas E. Watts, San Francisco, Calif., assignors to American Bitumuls Company, San Francisco, Calif., a corporation of Delaware No Drawing. Application February 10, 1936,
Serial No. 63,274

20 Claims. (Cl. 106—160)

This invention relates to the treatment of soils, mineral aggregate or combinations of soil and mineral aggregate by means of which the natural cohesive and cementitious characteristics of the materials may be utilized to their fullest extent by preventing the loss of these properties due to the absorption of excess water.

The invention also relates to the making available for construction purposes at low cost of treatment, materials heretofore considered as unsuitable, by either treating the materials as found or by blending the materials in accordance with newly discovered scientific principles and thereafter stabilizing them against capillarity and/or loss of strength by the addition of predetermined quantities of bituminous or other water-repellent materials.

It is well known that clayey soils or other materials containing finely divided particles when normally dry possess a high degree of cohesion or stability due to adsorbed films of water of great density. This cohesion is rapidly lost as the moisture content is increased by absorption due to increases in thickness of the moisture film surrounding the particles and their resultant decrease of density. As the thickness of the films is increased and the density of the films decreased, the particles of soil are permitted to separate and the thickened films act as a lubricant. With continued increases in percentages of moisture, the thickness of these films increases until all cohesion is lost and the material assumes plastic or fluid characteristics.

It has long been well known practice to produce a plastic bituminized road surfacing by mixing water, bituminous material and soil and by kneading the same into a homogeneous mass. Bituminous material of high viscosity or melting point such as asphalt being mechanically unsuitable for such treatment it was necessary to use light bituminous products such as crude oil, road oil and soft tars, and it was the practice to use these products in sufficient quantity to act as a binding medium. Due to the percentages of light bituminous material used in this treatment, and the fact that low viscosity oils were of necessity used in order to secure uniform dispersion through the mass at atmospheric temperatures, the resultant mixtures were plastic and subject to distortion under impact and under tractive forces exerted by modern power-propelled vehicles. The natural cohesive characteristics of the soils, which when dry might have had great stability, were destroyed by the presence of thick films of these light bituminous products which covered the adsorbed cohesion furnishing films and acted as a lubricant and thus reduced the stability of the soil against displacement.

It has also been well known practice to apply tars, oils or asphalts in molten or emulsified condition in pre-mixed or mixed-in-place treatments of mineral aggregates possessing natural or inherent stability. In order to secure inherent stability, attention was of necessity paid to grading and to the natural frictional resistance of the aggregates. The fine particles in such mixes were of necessity limited to small percentages, rarely if ever exceeding fifteen per cent, and it was also well known that the fine materials in such mixes should be free from colloidal properties which would destroy the stability of the mixtures in the presence of moisture. Mineral aggregate having these necessary properties had to be carefully selected and prepared and was, therefore costly. In such mixes sufficient bitumen was of necessity used to act as a binding medium, this requiring a very appreciable thickness of film because of the non-cohesive properties of the aggregate. Frequently sufficient bituminous material was used to completely fill the voids between the mineral particles. As a result, stability was dependent in part on frictional resistance of the mineral particles and in part due to the viscosity and resistance to displacement of the bituminous film which because of its thickness had low density. In this type of construction, stability due to cohesive characteristics of the finer materials was completely ignored and, in fact, prevented by the presence of the relatively thick bituminous films.

It has also been known that the capillarity of soils could be reduced and some degree of stability attained by mixing bituminous emulsions with the soils and thereafter compacting and drying the soils. In this practice there was no conception of correlating the quantity of bituminous material with respect to the gradation and particle size of soil and of producing in such mixtures a high degree of stability due to the thinness of films which would destroy capillarity, and yet preserve the density of the film, giving stability in the mixture due to the cohesive properties of the soil.

In this previous practice the sole objective was to render the treated material impervious to water, there being no proper conception of the principles by which stability could be imparted to the mixture without using bitumen in a relatively large proportion and sufficient to act as a binder.

It is the object of this invention to provide a method by which soils, mineral aggregates containing cementitious materials, or designed blends of these materials, can be rendered resistant to moisture without diminishing stability due to their natural cementitious qualities.

It is also the object of this invention to provide a method by which bituminous content can be accurately correlated with the particle size of soil mixtures to give a maximum of resistance against absorption or against loss of resistance to displacement, or both of these desirable characteristics.

A further object of this invention is to furnish methods of design by which the particle size distribution of soils may be altered with inexpensive granular materials, and the blend then stabilized against absorption and/or displacement by correlating the amount of bituminous material with the altered particle size distribution to obtain the required predetermined stability with a minimum amount of bituminous material and thereby effect a saving over the stabilization of the natural soil encountered on the work.

Another object of this invention is to supply methods whereby the most suitable stabilizing medium can be designed and made or selected to accomplish the best obtainable result.

Another object of this invention is to provide a method whereby bituminous water-repellent materials may be so intimately associated with soils that the characteristics of the bituminous materials become entirely changed so that they are no longer soluble in solvents which would normally completely remove them from the mixture.

A further object of this invention is to provide a method whereby soils having low cohesive strength may not only be made water-repellent, but may also have their strength increased.

Another object of this invention is to furnish a procedure whereby sands or other granular materials unsuitable for stabilization in their natural state may be rendered stable against absorption of water and/or displacement by the controlled incorporation of cementitious matter stabilized in accordance with the principles disclosed.

Another object of this invention is to supply a method whereby soils which normally increase in volume from their dry state to one of saturation can be maintained at a substantially constant volume in the presence of water.

Another object of this invention is to provide a method whereby a soil may be treated so that even after absorbing as much water as an untreated soil of the same type, it will maintain a substantially higher structural strength.

Another object of this invention is to provide a method for treatment of soils which allows them to be so changed in their character as to permit of their being ground to a fine powder and floated on water without sinking.

A further object of this invention is to furnish methods for the efficient and economical preparation of soils and other mineral matter for use wherever resistance to displacement is important and/or absorption of moisture objectionable, as in the paving of highways, airport runways, dam construction, ditch-linings, airdried brick construction, water cut-off walls, treatments to prevent wind and water erosion and the like.

Other objects of the invention will be apparent from the following description and examples.

Throughout the specifications and claims certain terms will be used which do not have generally understood or definite meanings in the art. These will here be defined so that wherever they appear their meaning may be clearly understood and the specification and claims accurately interpreted.

"Soil" is mineral matter produced by the natural or artificial disintegration of rock or rocky materials or other mineral substances and consists of varying proportions of sand, silt and clay.

"Sand" is the portion of the soil which passes a sieve having 10 meshes per linear inch and having a particle size larger than .05 millimeters in diameter.

"Silt" is the portion of soil having particle sizes between .05 and .005 millimeter in diameter.

"Clay" is the portion of soil having a particle size of less than .005 millimeter in diameter.

"Colloidal clay" is clay having a particle size of less than .001 millimeter in diameter.

"Suspensible clay" is clay which is separated by chemical and mechanical treatment in a special test devised as a part of this invention and hereinafter described.

"Mineral aggregate" is defined to mean particles of rock, sand or similar mineral substance larger in size than .074 millimeter in diameter, whether occurring separately or in combination with soils as above defined.

"Mineral matter" as used herein is defined to mean a blend of mineral aggregate with any or all of the ingredients of soil, whether blended by nature or artificially by mixing, or soil alone.

"Bituminous material" and "bitumen" are defined as including all petroleum products, natural asphalts and tars.

"Asphalt" is defined as natural asphalt or residue refined from petroleum and having a penetration at 77° F. by standard test methods of not more than 400.

"Oils," except where otherwise described, are understood to be products of distillation of petroleum which are softer than asphalt.

"Stability" where used alone means resistance of mineral matter to displacement and to absorption, except where specifically limited in the text to either type of stabilization.

"Emulsion" means a dispersion of bitumen in water.

"Stabilized emulsion" is an emulsion containing ingredients which prevent the coalescence of the bitumen until after it has been mixed with mineral matter.

The invention involves certain critical factors derived from a study and analysis of mineral matter and the correlation of these factors with bitumen content in the treatment of such mineral matter with bituminous materials. The following described operations jointly and severally comprise the invention. The theories involved in the invention are explained as far as understood at the present, and the applications of the theories demonstrated by typical examples.

The basic material which goes to make up three distinct ingredients of soil, namely, sand, silt and clay, may be the same. This basic material has a certain affinity for water and, regardless of the size of the particles, adsorbs on its surface a definite thickness of water film.

When saturated with water, clay not only has the voids between the particles filled with water, but the thickness of the water film on the particles is so great in relation to the size of the particles that the particles can no longer come into contact through the water. The density of the thick film of water is so low that no cohesive force can be exerted and the clay, therefore, becomes a water-lubricated mass without any appreciable ability to resist displacement, and is in fact more or less liquid in consistency.

When the water is removed by drying, the moisture film is reduced in thickness and increased in density until it becomes so dense that it is virtually a solid and cannot be removed by heat, even at temperatures up to 500° F. The force of adsorption exerted on the films has been determined to be as much as 9,000 to 15,000 atmospheres. With such dense films, great cohesive strength is present in a clay.

Silt, sand and other coarser particles develop less cohesive strength, even with dense adsorbed moisture films, due to the fewer particles in a given volume and, therefore, fewer points of film contact.

At atmospheric dryness clay forms into a hard cemented mass, having characteristics very similar to cement concrete. It has the faculty of cementing other materials together which are mixed with it and if kept dry furnishes high strengths.

Because it is the object of the present invention to utilize clay as a principal binding medium, the first stage in the practice of the invention is to determine the per cent and particle size of the clay contained in the mineral matter to be stabilized. It is also necessary, for reasons which will later become apparent, to determine the per cent of silt and of fine sand between .074 and .005 millimeter in diameter, as well as the percentage of mineral matter coarser than .074 millimeter in diameter.

The percentages of various sized particles are determined by hydrometer analyses and screen analyses by methods regularly used for this purpose, as described in the publications of the United States Bureau of Public Roads, and elsewhere.

It has been determined by compressive and flexural strength tests that a minimum of about 15% of particles smaller than .074 millimeter, including about 5% minimum of clay, should generally be present in the usual mineral matter to secure satisfactory cementitious properties. Some mineral matter has been found with less fine sand, silt and clay which possesses the required strength after wetting and drying and also after stabilization, and the invention is, therefore, not limited to the minimum percentages stated. If the mineral matter is found to be deficient in fine sand, silt and/or clay to give the required strength, these ingredients may be added or the mineral matter blended with other mineral matter containing the required ingredients.

Assume that a mineral aggregate is encounted, or mineral matter containing less than 15% of particles smaller than 0.074 millimeter in diameter including less than 5% of clay. Such material would generally have unsatisfactory structural strength when dry, and cementitious properties could be imparted by incorporating clay with or without sand or silt to provide an amount of these ingredients equal to or in excess of the above minimum proportions. The present invention contemplates among its several phases the treatment of mineral matter and aggregates in this manner with the further treatment whereby the resulting mixture is stabilized against impairment of the cementitious properties thus imparted.

This is accomplished by providing a controlled and designed bituminous film on the separate particles according to the principles of the invention and may be effected by incorporating in the mineral matter or aggregate the predetermined amount of fine material wet or dry and thereafter adding the proper proportion of bituminous emulsion as described, or the bituminous emulsion may be mixed with the fine material and thereafter incorporated in the mineral matter or aggregates. Therefore, in selecting a clay for enriching sand soils from one of a number of sources the user should be influenced by the source which provides a clay having the required cementitious properties and requiring the minimum of bituminous material for stabilization.

Larger quantities of fine material than the minimum above stated do not reduce the structural strength, but as will be presently apparent, the amount of bituminous material required for stabilization increases as the particle sizes decrease and, therefore, as a matter of economy mineral aggregate may be added to the mineral matter to be treated to reduce proportions of fine materials to minimum limits approximately as above specified, thus effecting a saving without reducing the strength of the stabilized material below predetermined allowable limits. The exact methods used will be clear from examples given in subsequent sections of this specification.

In order to measure the strength of stabilized and unstabilized materials and to determine relative stability against absorption of various stabilization treatments, and also to make possible accurate determination of the optimum quantity and quality of various stabilizing materials, it has been necessary to devise and invent new and novel test methods which are described as follows:

The test for stability against absorption of moisture is made on treated and untreated cylindrical specimens, compressed into a shape 2 inches in diameter by 3 to 4 inches in height, and dried to constant weight at 140° F. These samples are all placed upon end on a thoroughly water-saturated porous base which is constantly supplied with water so that the samples are allowed to take up moisture in such quantities and as rapidly as they demand it. In order to prevent any loss of moisture from the samples during their wetting period, they are enclosed in a compartment and, in addition, each sample is covered on its sides and top. Daily weighings over a predetermined period of time show the rate and amount of water absorption.

The test for stability against deformation is made on the same samples immediately after the test for water absorption has been completed. The sample containing all of the water absorbed in the absorption test is placed with the wetter end downward inside a cylindrical supporting mold having one square inch area circular orifice centered in its bottom. Force is applied to the top of the sample at a constant rate of one-half inch per minute to cause it to be extruded through the orifice. As each one-half inch of sample height has been extruded, the amount of pressure found necessary to cause the extrusion is measured and is recorded as the stability of the specimen at that level.

The test for suspensible clay is made in almost an identical manner to that for particle size by hydrometer analysis hereto mentioned. Instead, however, of subjecting the clay, water and sodium silicate mixture to intensive agitation, it is merely lightly stirred into suspension by hand. From that point on the hydrometer method of determining the weight of particles in suspension is carried out. All material remaining in suspension at the end of one hour settling period is considered to be suspensible clay.

Prior to our invention it has been impossible to scientifically utilize the natural cementitious strength of mineral matter due to the fact that under service conditions it takes up water and loses its strength. To make permanently effective the high natural strengths it becomes necessary to change the characteristics of the fine portion of the mineral matter so that the surfaces of these particles no longer have an affinity for water. This must be done without reducing the natural binding characteristics of the soil.

The mixing of oil with dry pulverized soil does not accomplish this objective. Dry soil is made up of groups of particles so firmly bound together that mechanical pulverizing is not sufficient to separate them into individual particles. In mixing oil with dry soil the effect is to coat the exterior of the groups of particles without actually coating each particle. A large percentage of the surfaces of the individual particles is, therefore, left uncoated and moisture can still enter these groups and cause the untreated particles to be separated by increasing the thickness of the adsorbed water film. Even if thin films could be placed on these groups of particles, the ultimate binding strength could not be attained which would be available if the particles were free to act independently and develop their full cohesive strength.

A soil can be broken up into its individual particles by mixing it with water so that the adsorption of water forcibly separates the particles.

In our process of stabilization finely dispersed bituminous material is suspended in water and carried by water as a vehicle into immediate association with the separated soil particles. At this stage of the operation the bituminous material is in practically colloidal form. The particles of water-repellent material are so extremely fine that they remain suspended in the water phase throughout the mixing operation. The bituminous colloids are thus uniformly distributed among the soil particles.

The addition of the bituminous water-repellent materials thus having been accomplished, the mixture is of necessity permitted to dry in order to develop effective stabilization.

As the quantity of water decreases on the drying out of the mixture, the films on the soil particles become thinner and more dense due to the forces of adsorption. As the films become thinner, surface tension of these films is increased to such an extent that they pull the relatively viscous bituminous material into extremely thin films over the surface of the particles.

As the surface tension and density of the adsorbed films still further increase, the bituminous material replaces in the adsorbed film a portion of the more volatile moisture present. These forces of adsorption are so extremely great that the actual character of the coating material becomes entirely changed.

A large portion of the bituminous coating is held so firmly and under such force that the usual solvents, such as carbon tetrachloride, etc., no longer dissolve it from the particle surfaces. In some soils it has been found that as much as 6% of asphalt, by weight of the soil, is retained against extraction by carbon tetrachloride.

In order to get this result it is, naturally, desirable to remove as much water as possible to secure a maximum reduction of the total film thickness. It can be readily seen from this that the efficiency of drying of the mixture is of extreme importance. As an example: a soil which has been mixed with emulsified asphalt and dried to a constant weight at 80° F. takes up water twice as rapidly in the absorption test as the same treated soil dried to a constant weight at 140° F.

Table 1A shows results of tests for stability against absorption and against displacement of identical soil samples stabilized with the same amount of stabilized emulsion but dried at different temperatures to a constant weight before being subjected to the absorption test.

TABLE 1A

| Drying temperature | Stability, 30 days | |
| --- | --- | --- |
| | Absorption of water | Resistance to displacement total load |
| | Per cent | Lbs. per sq. in. |
| 80° | 5.5 | 2,000 |
| 100° | 4.5 | 4,200 |
| 120° | 3.5 | 6,500 |
| 140° | 2.6 | 14,000 |

In the design of stabilized mixtures according to the methods disclosed above it has been found that the efficiency of stabilization obtained varies with different stabilizing mediums and with the quantity of stabilizer. Some of the characteristics of these resulting mixtures will be shown in the following examples. After the soil has been tested, the mixture designed and the optimum amount of bituminous material necessary for stabilization has been determined, the following methods of treatment can be employed.

In types of construction where maximum stability is required, both against absorption of water and displacement under load, our preferred method of stabilization consists of supplying water to separate the particles of mineral matter and the addition of a stabilized emulsion of maximum efficiency, as hereinafter described. The required water may be added before the stabilized emulsion, either in whole or in part, or may be used to dilute the stabilized emulsion, and the diluted emulsion mixed with the mineral matter. Enough water must be used to separate the particles of mineral matter and this is usually about the amount required to bring the mineral matter to a consistency known as the plastic limit. A portion of the water may already be present in the mineral matter from natural causes, if so, less water need be added. Increases in water beyond the minimum requirement as indicated are not objectionable or damaging to stabilization, even up to the point of actual fluidity of the mixture, which might be defined as a sloppy consistency. The only disadvantages from unnecessary amounts of water are the longer time required for drying and the greater shrinkage resulting from the loss of the unnecessarily large volume of water.

Any method of mixing may be used which results in uniform dispersion of the particles of bitumen. The use of a portable or stationary mechanical mixer, with blades or paddles, is recommended as being the most efficient and the least expensive method. Several types of such mixers are now readily available on the market.

Typical examples of the effect of stabilization by the use of stabilized emulsion are illustrated in Table 1, in which is shown the absorption and stability against displacement of stabilized and unstabilized samples of two widely different soils. The results shown in this and subsequent tables were obtained by the special absorption and stability test methods hereinbefore described.

TABLE 1

ADOBE SOIL

*Absorption tests*

| Days | Untreated; water absorbed | Treated 12.9% stabilized emulsion; water absorbed |
|---|---|---|
| | Per cent | Per cent |
| 1 | 14.0 | 1.6 |
| 2 | 20.5 | 2.5 |
| 7 | 30.0 | 4.3 |

*Stability tests*

| Strata | (7 days) Untreated load | (7 days) Treated load |
|---|---|---|
| | Lbs. sq. in. | Lbs. sq. in. |
| 1st ½" | 0 | 4,900 |
| 2nd ½" | 0 | 8,300 |
| 3rd ½" | 0 | 18,800 |
| 4th ½" | 16 | 25,000 |

SANDY SOIL

*Absorption tests*

| Days | Untreated; water absorbed | Treated 4.2% stabilized emulsion; water absorbed |
|---|---|---|
| | Per cent | Per cent |
| 1 | 10.5 | 0.2 |
| 3 | 11.0 | 0.5 |
| 5 | 11.5 | 0.7 |
| 7 | 11.5 | 0.78 |
| 13 | | 1.1 |

*Stability tests*

| Strata | (7 days) Untreated load | (13 days) Treated load |
|---|---|---|
| | Lbs. sq. in. | Lbs. sq. in. |
| 1st ½" | 2,500 | 14,000 |
| 2nd ½" | 2,500 | 17,100 |
| 3rd ½" | 3,150 | 17,100 |
| 4th ½" | 4,400 | 17,100 |

In this table is shown absorption, based on the total weight of the specimens, dried to a constant weight at 140° F. prior to the absorption test. The adobe soil is a type which would not be regarded in road-building practice as being even suitable for use as subgrade material adjacent to a pavement. By the new and novel method of stabilization described herein, this soil is made highly resistant to moisture absorption and given great stability against displacement in the presence of water in quantities sufficient to render the unstabilized soil a soft plastic mud.

In order to make our invention of maximum utility, it is not only necessary to determine proper methods of securing stability, but also to give the invention economic utility by discovering and disclosing types of stabilizers of low cost and maximum efficiency; also, to disclose means for reducing to a minimum the quantities necessary to accomplish the desired stabilization.

Our discoveries to date have indicated that the most effective bituminous material for securing stability—both against absorption and displacement—is a stabilized emulsion containing asphalt having a penetration of approximately 55 when tested at 77° F. by the usual methods. Such stabilized emulsion must contain ingredients which prevent coalescence of the asphalt particles during the mixing operation and at the same time do not reduce the efficiency of the asphalt film remaining on the particles of mineral matter.

Stabilized emulsions containing soaps, such as potassium and sodium oleates or resinates, have been found to be relatively inefficient in giving the desired properties to stabilized emulsion. The presence of such soaps gives appreciable mixing properties to the emulsion and, after being incorporated into the mineral matter as hereinbefore described, some degree of stability results.

The most efficient stabilized emulsion which we have as yet discovered is an emulsion made with asphalt and water, containing a small amount of caustic, by the method described by Montgomerie in United States Patent No. 1,643,675. This emulsion, of the quick-breaking type, is rendered suitable for use by the addition, either before or after cooling, of small amounts of protein substances, such as casein, dried skimmed milk or animal blood. The efficiency of the stabilized emulsion is greatest when the least amount of any of these proteins is present which will impart to the emulsion the necessary mixing properties. The most efficient substance so far discovered is animal blood added to the emulsion either immediately after manufacture or subsequently after the emulsion has cooled to atmospheric temperatures. $\tfrac{1}{10}$% of blood, based on its dry weight, has been found to be the minimum amount which would give the emulsion the necessary mixing properties, although upwards of 1% has been found satisfactory. A small proportion of a suitable preservative, say $\tfrac{1}{10}$% to 2%, preferably $\tfrac{1}{10}$% to $\tfrac{1}{10}$% of formalin, in the form of a 40% solution of formaldehyde, is also usually added to the emulsion to prevent deterioration of the protein. The preferred emulsion and its manufacture are described in United States Patent 2,074,731 issued March 23, 1937, in the name of Claude L. McKesson.

There are undoubtedly other substances than those named which will give similar properties to an emulsion and this invention is not limited to the use of emulsified asphalts containing blood, any other of the proteins named, or any other substances which impart similar properties. The effect on the efficiency of a stabilized emulsion with varying percentages of the ingredients above mentioned is shown in Table 2.

TABLE 2
*Absorption test*

| Time | No emulsion; water absorbed | Emulsion content | | | |
|---|---|---|---|---|---|
| | | .3% dry weight, blood; water absorbed | 1% dry weight, blood; water absorbed | 1% dry weight, skimmed milk water absorbed | 1% dry weight, casein; water absorbed |
| | Per cent | Per cent | Per cent | Per cent | Per cent |
| 29 days | 18.4 | 2.6 | 3.2 | 3.8 | 3.3 |

*Stability tests*

| Strata | Untreated; load | Treated | | | |
|---|---|---|---|---|---|
| | | Load | Load | Load | Load |
| | Lbs. sq. in. | Lbs. sq. in. | Lbs. sq. in. | Lbs. sq. in. | Lbs. sq. in. |
| 1st ¼" | 0 | 14,000+ | 7,000 | 4,000 | 5,500 |
| 2nd ¼" | 50 | 14,000 | 14,000 | 9,000 | 13,200 |
| 3rd ¼" | 50 | 14,000 | 14,000 | 13,000 | 14,000+ |
| 4th ¼" | 50 | 14,000 | 14,000 | 14,000 | 14,000 |

Table 3 shows the relative efficiency of a stabilized emulsion containing 50 to 60 penetration asphalt and otherwise identical emulsions containing higher penetration asphalts in stabilizing a typical soil mixture.

TABLE 3

| Asphalt | Stability, 30 days | |
|---|---|---|
| | Against absorption | Against displacment |
| | Per cent | Lbs. sq. in. |
| 350+ penetration | 3.05 | 7,500 |
| 300–350 penetration | 3.20 | 10,000 |
| 250–300 penetration | 2.85 | 11,500 |
| 50–60 penetration | 3.00 | 13,500 |

An example of our disclosure relating to the selection and design of economical mineral matter and blends thereof for the purpose of effecting greater efficiency and economy is shown in Table 4.

TABLE 4
*Absorption tests*

| Days | Blend: 70% sand; 30% adobe | | Adobe | |
|---|---|---|---|---|
| | Untreated; water absorbed | Treated, 4.1% stabilized emulsion; water absorbed | Untreated; water absorbed | Treated, 13.7% stabilized emulsion; water absorbed |
| | Per cent | Per cent | Per cent | Per cent |
| 1 | 11.3 | .4 | 40.3 | 0.2 |
| 4 | 12.1 | .8 | 50.2 | 0.8 |
| 5 | 12.3 | .9 | 52.0 | 0.9 |
| 6 | 12.4 | 1.0 | 54.0 | 1.0 |
| 7 | 12.5 | 1.2 | 54.4 | 1.0 |

*Stability tests*

| Strata | Untreated, load | Treated; load | Untreated; load | Treated; load |
|---|---|---|---|---|
| | Lbs. sq. in. | Lbs. sq. in. | Lbs. sq. in. | Lbs. sq. in. |
| 1st ½" | 2,300 | 14,000+ | 250 | 14,000+ |
| 2nd ½" | 5,500 | 14,000+ | 200 | 14,000+ |
| 3rd ½" | 10,000 | 14,000+ | 250 | 14,000+ |
| 4th ½" | 14,000 | 14,000+ | 300 | 14,000+ |

Note.—14,000 lbs. is the limit of the testing equipment used in these tests and, therefore, the plus sign after load figures indicates a resistance too great to be measured in this machine.

Here is shown an adobe soil containing 92% of particles finer than .074 millimeter in diameter and practically a fluid when wet. The adobe alone was successfully stabilized with 13.7% of stabilized emulsion. A sand was available at low cost, all of which was coarser than .074 millimeter diameter, contained no cementitious material and was, therefore, unsuitable for proper stabilization by the methods we have disclosed. A blend of 30% of adobe and 70% of the sand was made, resulting in 27.4% of particles smaller than .074 millimeter in diameter. The blend was stabilized with 4.1% of the same stabilized emulsion, 30% of that used in the adobe alone. The test results show perfect stabilization of the blend with 70% reduction in the amount of stabilized emulsion required and, therefore, a great saving.

We have discovered that the correct proportion of stabilized emulsion required can be determined for nearly all mineral matter by empirical formula based on particle size (and, therefore, indirectly on surface area) using therewith a constant determined for the particular soil, but not varying for different gradings of that same soil.

The formula is capable of expression in many forms without changing the results and our invention relates to the use of a formula of this general type, based upon the principles enumerated and not on the specific formula which follows:

$$S = K\,(.05\,a \text{ plus } .10\,b \text{ plus } .35\,c)$$

in which
S = percentage of stabilized emulsion required
$a$ = percentage of soil passing a No. 200 sieve (wet method) and coarser than .005 mm.
$b$ = percentage of soil between .005 mm. and .001 mm. in particle size.
$c$ = colloidal clay finer than .001 mm. particle size.
K = a constant for the particular soil to be treated. (For most soils K=1.)

The following formulae are used to determine the value for K in the above formula:

1. For soil containing up to 25% of clay:

$$K = \frac{Y/X}{1}$$

2. For soils containing more than 25% and less than 45% of clay:

$$K = \frac{Y/X}{.5}$$

3. For soils containing more than 45 and less than 75% of clay:

$$K = \frac{Y/X}{.33}$$

4. For soils containing more than 75% of clay:

$$K = \frac{Y/X}{.25}$$

in which
Y = per cent of suspensible clay
X = per cent of .005 mm. or smaller clay in the soil.

The value Y above, is determined by the method proposed in vol. 35 of the American Society for Testing Materials Proceedings, part 1, year 1935—designation D 422–35T, pages 953 to 965, except that mechanical stirring in the dispersion cup is replaced by shaking one minute in the graduate in which the hydrometer measurements are made. The suspension which is tested with the hydrometer consists of 50 to 100 grams of soil, 22 cc. of 3° Bé. solution of sodium silicate ($Na_2SiO_3 \cdot 9H_2O$) at 76° F. and enough water to make up 1000 cc. total volume at 67° F.

In addition to the above method for determining the value of K for any given soil, actual tests for stability and moisture absorption with various degrees of treatment can be used. By testing samples treated with varying amounts of the stabilizing medium covering a range above and below the optimum quantity the most efficient amount can be determined. This quantity is then divided by the quantity shown by the formula while considering K as 1 and this quotient becomes K for that particular soil.

Once the value for K has been determined for any soil it holds for any grading or particle distribution of that soil.

Table 5 shows properties of three widely different soils; the economic optimum required amount of stabilized emulsion as determined by the above formula and also the optimum amount determined by "cut and try" tests made using various arbitrary quantities. Stability shown on samples was run on specimens containing the amount of stabilized emulsion required by the formula.

stability against displacement in this stratum to 3,500 pounds. Above 18% of stabilized emulsion the effect of the additional thickness of the bituminous film resulting destroys the natural cementitious properties of the soil under test.

TABLE 6

| Percent stabilized emulsion | Percent water absorbed | Stability in total load—Pounds per sq. in. | | |
|---|---|---|---|---|
| | | 1st ½" stratum | 2nd ½" stratum | 3rd ½" stratum |
| 0.0 | 34.6 | 0 | 25 | 25 |
| 9.0 | 6.9 | 4,900 | 9,900 | 12,000 |
| 18.0 | 4.2 | 5,200 | 10,300 | 12,000 |
| 27.0 | 3.2 | 4,400 | 6,800 | 7,300 |
| 36.0 | 2.7 | 3,000 | 4,500 | 5,000 |
| 45.0 | 2.2 | 2,000 | 3,000 | 3,500 |

We have disclosed that treated soil has greater stability against displacement then untreated soil even if not effectively stabilized against absorption. In actual tests, it was found that an untreated soil had a stability in the bottom half inch stratum of only 250 pounds with a moisture

TABLE 5

| Soil number and type | Percent passing 200 mesh sieve | (a) Percent passing 200 mesh and ret., .005 mm. | (b) Percent smaller, .005 mm., and larger, .001 mm. | (c) Percent smaller than .001 mm. | Suspensible clay | Optimum as shown by formula | Optimum as shown by tests | Percent water absorbed in 7 days | | Stability in lbs. sq. in. Total load after 7 days of absorption—1st ½" | |
|---|---|---|---|---|---|---|---|---|---|---|---|
| | | | | | | | | Unstabilized | Stabilized | Unstabilized | Stabilized |
| Adobe | 84.0 | 31.0 | 22.0 | 31.0 | 18.0 | 14.9 | 15.0 | 30.0 | 4.3 | 0.0 | 14,700 |
| Sandy clay | 35.0 | 22.0 | 5.0 | 8.0 | 13.0 | 4.4 | 4.0 | 11.5 | 1.1 | 7,500 | 42,000 |
| Adobe | 90.0 | 39.0 | 21.0 | 30.0 | 11.0 | 9.4 | 9.0 | 18.0 | 1.2 | 250 | *14,000+ |

*NOTE.—The maximum capacity of the testing machine used in this test was 14,000 and the ultimate strength was therefore not determined.

All of the above examples and formulae were based on the use of a stabilized emulsion containing 55% of asphalt. Increased or decreased asphaltic content in the stabilized emulsion will increase or decrease the amount of stabilized emulsion to be used in such manner as to secure the bituminous content used in the examples above, and required by the formula. Thus the actual asphalt content of the required percentage of stabilizer determined by the formulae or shown by the examples would be 55% of the percentages so determined or shown. The formula for percentage of stabilizer required could therefore be rewritten in terms of asphalt in accordance with the following equation:

$$S' = K (.0275 a \text{ plus } .055 b \text{ plus } .1925 c)$$

in which $S'$ = percentage of asphalt required.

We have discovered that optimum economic stability against absorption frequently requires more bituminous material than does stabilization to secure the economic optimum resistance to displacement. This is illustrated in Table 6 in which 9% of stabilized emulsion gave satisfactory stabilization against displacement while 27% of the same emulsion was necessary to give satisfactory stabilization against absorption. This table also illustrates our discovery that there is a definite optimum point of stabilization against displacement and that beyond this optimum point increased quantities of stabilized emulsion result in rapidly decreasing stability against displacement. In this table, maximum stability against displacement of 12,000 pounds is shown in the third ½ inch stratum with 9% of stabilized emulsion. Increases in stabilized emulsion up to 45% result in a reduction of this content present of 22.3% while a treated sample of the same soil had a stability of 9,100 pounds in the bottom half inch stratum with moisture present in the same amount.

We have also stated in our preceding disclosures that a portion of the adsorbed moisture film present on minute particles of mineral is actually displaced by the bituminous film in stabilization. This was clearly demonstrated in tests in which treated and untreated specimens were dried at 140° F. and then subsequently dried at 230° F., 18° above the boiling point of water. Between 140° F. and 230° F. the untreated sample showed a loss in moisture content of 1.85% while the treated sample showed a loss in moisture of only .71%. This showed that 1.14% of the dense moisture film had been replaced by the bituminous film.

As one of the objects of the invention it was stated that one of the purposes was to reduce the loss of stabilized mineral when subjected to wind and sand erosion. In an actual test sundried bricks were manufactured from the same soil, some being untreated and others stabilized by the addition of 10.7% of stabilized emulsion. The stabilized and unstabilized brick were placed in a wind tunnel, at right angles to a wind current having a velocity of 50 miles per hour and carrying a continuous flow of sand grains. The test was continued for 15 minutes, during which time the unstabilized adobe brick lost weight averaging 42.7 grams per square foot of area, while the stabilized brick lost only 5.25 grams per square foot of area.

In addition to this stabilization against wind erosion, the same adobe brick, untreated, showed an absorption of 21.9% in 8 days, while the stabilized brick showed an absorption of only 1.6% in the same period of exposure to a continuous film of moisture.

In pavement construction, dam construction and other work in which the surface of the structure is subjected to almost continuous presence of free moisture, it is desirable to secure in the exposed surface of the structure the maximum resistance to absorption and in order to secure necessary structural strength in the remainder of the structure, maximum resistance against displacement is desired. In our invention this is accomplished by stabilizing the area exposed to moisture to a point which will insure maximum resistance to absorption and treating the remainder of the structure to stabilize the same to the point of optimum stability against displacement.

In pavement construction, for example, it is our practice to use sufficient stabilizer in the bottom stratum of the pavement to resist to a maximum degree the absorption of moisture from the subgrade. As may be surmised from Table 6, this bottom stratum does not have maximum stability against displacement. The upper stratum of the pavement is, however, stabilized to give maximum resistance against displacement and this portion of the pavement is made of sufficient thickness to withstand stresses imposed by traffic.

Similarly, in dam construction the surface of the dam adjacent to the water is stabilized to a maximum resistance against absorption and the remainder of the dam stabilized to maximum resistance against displacement. In this manner we have utilized to the greatest economic advantage both of the functions of stabilization described herein. The portions of the structure which are stabilized against maximum resistance to displacement are protected from absorption by the stratum stabilized against absorption.

The methods of construction necessary to embody the new and novel ideas in this invention do not differ appreciably from construction practices now prevailing in other types of work. The blending of materials in accordance with the theories of design herein incorporated may be readily accomplished with hand labor or by any of the ordinary mechanical mixing equipment used in other types of construction. The incorporation of water and of bituminous material is accomplished by the use of tank trucks or any other commercially available equipment now used in other types of construction for the spreading of liquids. Mixing is frequently accomplished by hand, but may be done with blade-graders, road-mixing or plant-mixing equipment, of which many types are in every day use, and the type of equipment used forms no part of this invention.

We have discovered that the most economical method of enriching the bottom stratum of the pavement to give increased stability against absorption is to use a type of mixing equipment which during mixing operation elevates the mineral matter above the subgrade and of providing a spray-bar for applying the bituminous material to the subgrade before the mixture is returned from the mixer to the subgrade.

The compaction of the stabilized mixture is usually accomplished in part by shrinkage due to drying and in part by the use of ordinary rollers, tamping rollers or any other similar equipment. It is not absolutely essential that any roller be used because in drying out stabilized mixtures of the type described, shrinkage due to the decrease in film thickness during drying will produce greater compaction than is possible to obtain by any type of artificial compaction.

If stabilized mixtures are laid wet and not continuously compacted with rollers or other equipment, considerable shrinkage usually results leaving the surface with open cracks. After the stabilized material has completely dehydrated these may be closed by adding stabilized material, by loosening a portion of the already stabilized surface and placing in the open cracks, or the cracks may be closed during the subsequent construction of a top or wearing surface.

It is desirable that stabilized areas which are to be subjected to vehicular traffic be provided with a wearing surface to give additional resistance to absorption. The type of such surfaces does not constitute a part of this invention and may range from an ordinary surface treatment with bituminous materials, to the construction of heavy bituminous or cement concrete pavement.

As will be obvious to those skilled in the art, numerous variations and modifications may be made in the procedures and examples recited without departing from the spirit of the invention, and the invention embraces all such variations and modifications within the scope of the appended claims.

We claim:

1. The method of stabilizing typical soil mixtures containing not less than 15% of particles smaller than .074 millimeter in size and not less than 5% of colloidal sized particles smaller than .001 millimeter in size which comprises thoroughly mixing therewith an aqueous emulsion of asphalt stable against breakdown on contact with the soil mixture together with added water to produce a plastic mass having fluid characteristics containing asphalt distributed therein, the percentage of asphalt equaling approximately the sum of the products of the percentage of soil particles between .074 and .005 millimeter in size, times .0275; plus the percentage of particles between .005 and .001 millimeter in size, times .055; plus the percentage of particles smaller than .001 millimeter in size, times 0.1925.

2. The method of stabilizing soil mixtures containing not less than 15% of particles smaller than .074 millimeter in size and not less than 5% of colloidal sized particles smaller than .001 millimeter in size which comprises thoroughly mixing therewith an aqueous emulsion of asphalt stable against breakdown on contact with the soil mixture the percentage of asphalt present being approximately 55% of the sum of the products of the percentage of soil particles in the said mixture between .074 and .005 millimeter in size, times .05; plus the percentage of particles between .005 and .001 millimeter in size, times 0.1; plus the percentage of particles smaller than .001 millimeter in size, times 0.35; multiplied by a predetermined constant for the soil of 0.5 to 1.5, dependent on the amount of clay contained in said soil mixture and its character, water being present in quantity sufficient to produce a plastic mass having fluid characteristics, and finally drying the mass.

3. The method of stabilizing soil mixtures described in claim 2 in which the emulsion contains approximately 55% of asphalt emulsified in alkaline water and including a stabilizing agent capable of preventing breakdown of the emulsion in the presence of the soil mixture until mixing is completed.

4. The method as described in claim 2 in which the emulsion contains approximately 55% of asphalt having an approximate penetration of 55 at 25° C., emulsified in alkaline water and stabilized against breakdown by the addition of animal blood in proportion of $\frac{1}{10}$% to 1% dry weight.

5. In the method of stabilizing soil mixtures against absorption of water when dry, said soil mixtures containing not less than 15% of particles smaller than .074 millimeter in size and not less than 5% of colloidal sized particles smaller than .001 millimeter, the step which comprises thoroughly mixing therewith an emulsion containing approximately 55% of asphalt having an approximate penetration of 55 at 25° C., emulsified in alkaline water and stabilized against breakdown by the addition of animal blood in a quantity of $\frac{1}{10}$% to 1% dry weight, and also containing a 40% solution of formaldehyde in quantity of $\frac{1}{10}$% to 2%, the percentage of said emulsion equaling approximately the sum of the products of the percentage of soil particles between .074 and .005 millimeter in size, times .05; plus the percentage of particles between .005 and .001 millimeter in size, times 0.1; plus the percentage of particles smaller than .001 millimeter in size, times 0.35; multiplied by a predetermined constant for the soil of 0.5 to 1.5 dependent on the amount of clay contained and its character, water being present in quantity not less than twice the amount of said emulsion.

6. A clay bound soil substantially resistant to displacement when wet containing bitumen adsorbed on the surfaces of the soil particles, the interstices of said soil being substantially free of unadsorbed bitumen.

7. A clay bound soil substantially resistant to displacement when wet characterized by thin films of bitumen on the surfaces of the soil particles, the spaces between said filmed soil particles being substantially free of bitumen.

8. A soil mixture capable of resisting absorption of water and displacement by pressure when dry comprising a plastic mixture of mineral matter, colloidal clay in proportions to provide substantial structural strength when dry, water and bituminous emulsion, the bitumen in said emulsion being of quantity and character insufficient to function as a binder between the soil mixture particles but sufficient to render the same resistant to reabsorption of water after drying.

9. The method of stabilizing soil mixtures containing colloidal matter having natural cementitious properties in proportions sufficient to produce structural strength when dry, which comprises plasticizing said soil mixture with water to separate the colloidal particles which tend to adhere to each other, surrounding the separated particles with water containing dispersed bitumen, precipitating the dispersed bitumen on said separated colloidal particles to coat the particles with an extremely thin adsorbed film of bitumen capable of inhibiting reabsorption of water by said colloidal matter after once drying, and maintaining the interstices of said soil mixture substantially free of unadsorbed bitumen whereby the colloidal matter functions as a binder and the composition when dry is substantially non-thermoplastic and non-hydroplastic.

10. The method of stabilizing soil mixtures containing substantial proportions of clay which comprises plasticizing said soil with water to separate clay particles which tend to adhere to each other, surrounding the separated particles with water containing dispersed bitumen in a finely emulsified state, precipitating the dispersed bitumen on said clay particles to coat the particles with an extremely thin adsorbed film of bitumen capable of inhibiting reabsorption of water by said clay after once drying, maintaining the interstices of said soil mixtures substantially free of unadsorbed bitumen and drying said mixture without substantial agitation, whereby a clay-bound substantially non-thermoplastic and non-hydroplastic structural material is obtained.

11. A substantially non-plastic structural material comprising a mineral aggregate, a binder for said aggregate comprising clay particles less than .005 mm. in diameter and an adsorbed film of bitumen on said particles, the interstices of said mineral aggregate being substantially free of unadsorbed bitumen.

12. The method of stabilizing soil mixtures containing clay in a proportion sufficient to impart structural strength to the mixture when dry which comprises determining the percentage of the soil passing a 200 mesh sieve and coarser than approximately .005 mm., determining the percentage of the soil having a particle size between approximately .005 and .001 mm., determining the percentage of colloidal clay finer than .001 mm. particle size in the soil, adding an emulsion of asphalt to the soil mixture, correlating the amount of asphalt added with the above determined particle size distribution to produce a thin water-resistant film of adsorbed asphalt on the clay particles, and maintaining the interstices of said soil mixture substantially free of unadsorbed asphalt by preventing coalescence of said asphalt emulsion with a stabilizing agent.

13. A method as defined in claim 12, in which the per cent of asphalt is approximately .0275 times the percentage of soil passing a 200 mesh sieve and coarser than .005 mm., plus .055 times the percentage of soil between approximately .005 mm. and .001 mm. in particle size, plus .1925 times the percentage of colloidal clay finer than .001 mm. in particle size.

14. The method of stabilizing soil mixtures containing at least approximately 15% of particles smaller than .074 mm., not less than approximately 5% clay and characterized by substantial structural strength when dry, which comprises determining the percentage of the soil passing a 200 mesh sieve and coarser than approximately .005 mm., determining the percentage of the soil having a particle size between approximately .005 and .001 mm. determining the percentage of colloidal clay finer than .001 mm. particle size in the soil, adding an emulsion of asphalt to the soil mixture correlating the amount of asphalt added with the above determined particle size distribution to produce a thin water-resistant film of adsorbed asphalt on the clay particles, and maintaining the interstices of said soil mixture substantially free of unadsorbed asphalt by preventing coalescence of said asphalt emulsion with a stabilizing agent.

15. The method of stabilizing soil mixtures containing natural cementitious material in proportion sufficient to impart structural strength to the mixture when dry which comprises mixing therewith an emulsion of asphalt, said asphalt having a penetration substantially no greater than 400, and producing a thin water-resistant film of adsorbed asphalt on the cementitious material by correlating the proportion of said asphalt with the character and particle size of said soil mixture and by maintaining the interstices of said mixture substantially free of unadsorbed asphalt by preventing coalescence of the asphalt in said emulsion.

16. A method for making waterproof shaped articles which comprises mixing adobe clay with an aqueous asphalt emulsion to produce a plastic having the asphalt evenly distributed throughout said clay and in which the asphalt retains its emulsified form, shaping said plastic into the desired article and subsequently drying said shaped article, said admixture of clay and emulsion and said shaping of said plastic being carried out at a temperature below the melting point of said asphalt.

17. A method for producing a plastic composition of matter which is adapted to be used in pavement, brick, and like construction which comprises mixing a relatively large amount of clay with a substantial amount of a preformed emulsified asphalt to form a homogeneous mixture of clay, water, and asphalt in which the asphalt retains the emulsified state in said clay, said preformed emulsified asphalt being produced by mixing a melted asphalt with an aqueous solution containing an emulsifying agent.

18. A method as in claim 17 in which said preformed emulsion is an emulsion of the slow breaking type.

19. A method of making a water-resistant unfused clay brick which comprises mixing an aqueous asphalt emulsion with clay to produce a plastic having the asphalt evenly distributed throughout said clay and in which the asphalt retains its emulsified form during mixing and molding of the plastic, molding said plastic into a brick and drying said molded brick, said admixture of clay and emulsion and said molding of said plastic being carried out at a temperature below the melting point of said asphalt, said asphalt being incorporated in an amount insufficient to render said brick thermoplastic when dry.

20. A clay-bound adobe brick having enhanced resistance to loss of structural strength in the presence of water, characterized by thin films of asphalt on the surfaces of the unfused clay particles, the space between the filmed particles being substantially free of asphalt.

CLAUDE L. McKESSON.
VILAS E. WATTS.